United States Patent
Robinson et al.

(10) Patent No.: US 9,679,406 B2
(45) Date of Patent: *Jun. 13, 2017

(54) SYSTEMS AND METHODS FOR PROVIDING A VISUALIZATION OF SATELLITE SIGHTLINE OBSTRUCTIONS

(71) Applicant: Google Inc., Mountain View, CA (US)

(72) Inventors: Craig Lewin Robinson, Palo Alto, CA (US); James Brian Roseborough, Piedmont, CA (US); Daniel Joseph Filip, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,380

(22) Filed: Jan. 8, 2016

(65) Prior Publication Data
US 2016/0125634 A1    May 5, 2016

Related U.S. Application Data

(63) Continuation of application No. 14/039,777, filed on Sep. 27, 2013, now Pat. No. 9,235,923.
(Continued)

(51) Int. Cl.
*G06T 15/00* (2011.01)
*G06T 11/60* (2006.01)
(Continued)

(52) U.S. Cl.
CPC .............. *G06T 11/60* (2013.01); *G06T 17/05* (2013.01); *G06T 19/006* (2013.01);
(Continued)

(58) Field of Classification Search
CPC .................... H04N 5/23238; H04B 7/18554
(Continued)

(56) References Cited

U.S. PATENT DOCUMENTS

| | | |
|---|---|---|
| 5,946,603 A | 8/1999 | Ibanez-Meier et al. |
| 6,070,051 A | 5/2000 | Astrom et al. |

(Continued)

OTHER PUBLICATIONS

Marais et al, "Land Mobile GGNSS availability and multipath evaluation tool," IEEE Trans. Veh. Tech., pp. 1697-1704, Sep. 2005.*

(Continued)

*Primary Examiner* — Phu K Nguyen
(74) *Attorney, Agent, or Firm* — Dority & Manning, P.A.

(57) ABSTRACT

Systems and methods for providing a visualization of satellite sightline obstructions are provided. An example method includes identifying an approximate position of a receiver antenna. The method further includes providing a rendering of a physical environment surrounding the receiver antenna for display within a user interface. The user interface can be provided on a display. Satellite positional data associated with the position of a satellite is accessed and a sightline between the approximate position of the receiver antenna and the position of the satellite is determined. The method further includes presenting the sightline within the user interface in association with the rendering. An example system includes a data capture system and a computing device to provide a visualization of satellite sightline obstructions.

20 Claims, 7 Drawing Sheets

Related U.S. Application Data (60) Provisional application No. 61/707,251, filed on Sep. 28, 2012.

(51) Int. Cl.

| | | |
|---|---|---|
| *H04B 7/185* | (2006.01) | |
| *H04N 5/232* | (2006.01) | |
| *G06T 17/05* | (2011.01) | |
| *G06T 19/00* | (2011.01) | |
| *H04W 16/22* | (2009.01) | |

(52) U.S. Cl.
CPC ..... *H04B 7/18519* (2013.01); *H04B 7/18554* (2013.01); *H04N 5/23238* (2013.01); *H04W 16/22* (2013.01)

(58) Field of Classification Search
USPC .............................. 345/418, 427; 348/36, 37
See application file for complete search history.

(56) References Cited

U.S. PATENT DOCUMENTS

| | | |
|---|---|---|
| 6,359,617 B1 | 3/2002 | Xiong |
| 2003/0063816 A1 | 4/2003 | Chen et al. |
| 2008/0143709 A1 | 6/2008 | Fassero et al. |
| 2009/0284411 A1 | 11/2009 | Tessier |
| 2011/0285810 A1 | 11/2011 | Wagner et al. |

OTHER PUBLICATIONS

Langer et al., "Weighting and Mitigation of Multipath Effects in GPS Range Measurements in an Urban Environment for Pedestrian Navigation", 2012 International Technical Meeting of the Institute of Navigation, Jan. 30-Feb. 1, 2012, Newport Beach, California, pp. 928-939.

Meguro et al., "GPS Multipath Mitigation for Urban Area Using Omnidirectional Infrared Camera", IEEE Transactions on Intelligent Transportation Systems, vol. 10, Issue 1, Mar. 2009, pp. 22-30.

"SatelliteLocator", iTunes, Updated on Oct. 2, 2013, https://itunes.apple.com/app/satellitelocator/id540894938?mt=8, 2 pages, Retrieved from the Internet on Jan. 20, 2017.

"DishPointer", http://www.dishpointer.com, 2 pages, Retrieved from the Internet on Jan. 20, 2017.

"DishPointer", http://www.dishpointer.com/2009/dishpointer-maps-iphone-app, 2 pages, Retrieved from the Internet on Jan. 20, 2017.

"DishPointer", http://www.dishpointer.com/2009/dishpointer-los-iphone-app, 3 pages, Retrieved from the Internet on Jan. 20, 2017.

Uksatellitehelp, "DishPointer Augmented Reality (iPhone Satellite Finder)", Youtube, Posted on Aug. 16, 2009, 1 page, Retrieved from the Internet on Jan. 20, 2017.

\* cited by examiner

SYSTEMS AND METHODS FOR PROVIDING A VISUALIZATION OF SATELLITE SIGHTLINE OBSTRUCTIONS

PRIORITY CLAIM

The present application is a continuation of U.S. application Ser. No. 14/039,777 having a filing date of Sep. 27, 2013 which claims the benefit of priority of U.S. Provisional Patent Application Ser. No. 61/707,251, titled System and Method for Providing a Visualization of Satellite Sightline Obstructions, filed Sep. 28, 2012. Applicant claims priority to and benefit of all such applications and incorporate all such applications herein by reference.

FIELD

The present disclosure relates generally to identifying satellite sightline obstructions. More particularly, the present disclosure relates to systems and methods for providing a visualization of satellite sightline obstructions.

BACKGROUND

Global positioning receivers calculate their position by precisely timing the signals sent by GPS satellites. Each GPS satellite transmits a message which includes the time of message transmission and the satellite's position at the time of message transmission. By differencing the given time of message transmission from the time of message receipt, GPS receivers can determine the transit time of each satellite message. By multiplying the transit time by the speed of light, the GPS receiver can calculate an approximate distance from the receiver antenna to the transmitting satellite, also known as a pseudorange. Taking the pseudoranges calculated from several satellites together with the given satellite positions at the time of message transmission, a GPS receiver can estimate its current position and clock offset.

Thus, accurate GPS positioning relies upon receiving clear, direct signals from the GPS satellites. Unfortunately, GPS signals can bounce or reflect off objects prior to being received by a receiver antenna. Such reflected signals travel a longer distance than unreflected signals, resulting in a longer transit time and therefore distorting positional calculations. This effect is known as the multipath effect and it causes significant positional calculation error. One form of multipath error occurs when a GPS receiver antenna observes a multipath signal from a satellite even though the direct sightline is obstructed. Knowledge of whether a sightline to a GPS satellite is obstructed can help detect possible multipath error and improve the accuracy of positional calculations.

SUMMARY

Aspects and advantages of the present disclosure will be set forth in part in the following description, or may be obvious from the description, or may be learned through practice of embodiments of the present disclosure.

One example aspect of the present disclosure is directed to a computer-implemented method of providing a visualization of sightline obstructions. The computer-implemented method includes identifying, by one or more computing devices, an approximate position of a receiver antenna. The computer-implemented method includes providing, by one or more computing devices, a rendering of a physical environment surrounding the receiver antenna for display within a user interface. The user interface is provided on a display. The computer-implemented method includes accessing, by the one or more computing devices, satellite positional data describing a position of a satellite. The computer-implemented method includes determining, by the one or more computing devices, a sightline between the approximate position of the receiver antenna and the position of the satellite. The computer-implemented method includes presenting, by the one or more computing devices, the sightline within the user interface in association with the rendering.

Other example aspects of the present disclosure are directed to systems, apparatus, non-transitory computer-readable media, devices, and user interfaces for providing a visualization of sightline obstructions between a receiver antenna and a satellite.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for providing a visualization of sightline obstructions between a receiver antenna and a satellite. More particularly, an interactive rendering of the physical surroundings of a receiver antenna can be presented within a user interface. Sightlines between the approximate position of the receiver antenna and the positions of satellites can be determined and presented in association with the rendering in the user interface. The rendering and sightlines can be analyzed to determine if a sightline is obstructed by any elements of the physical environment. In such fashion, obstructed satellites can be identified and the effects of multipath error can reduced, thereby increasing the accuracy of positional calculations.

According to aspects of the present disclosure, a visual rendering of sightline obstructions between a receiver antenna and a satellite can be presented within a user interface provided on a display device. For example, after identifying an approximate position of a receiver antenna, an interactive rendering of a physical environment surrounding the receiver antenna can be presented within the user interface. In particular, the rendering can be a rendering of a three-dimensional model. One or more sightlines to one or more satellites can then be determined and presented within the user interface in association with the rendering. In such fashion, the systems of the present disclosure can allow a user can visualize the sightlines relative to the physical environment surrounding the antenna.

In some implementations, the provided rendering can include a rendering of a three-dimensional panorama. As an example, the three dimensional panorama can be an approximately and/or partially spherical panorama, as is included in rendering 102 shown in FIGS. 1 and 2. For example, an approximately and/or partially spherical panorama can be created by stitching together a plurality of images captured by a camera and projecting the result onto a three-dimensional surface, such as, for example, a spherical surface, a conical surface, a hemispherical surface, an oval-type surface, or other suitable three-dimensional surface.

The rendering of the three-dimensional panorama can depict the physical environment surrounding the receiver antenna and facilitate visualization of any sightline obstructions. As an example, a spherical panorama can be centered about the approximate position of the receiver antenna. A user can visualize the intersection of sightlines and the spherical panorama in the user interface to identify sightline obstructions.

Figure 1:
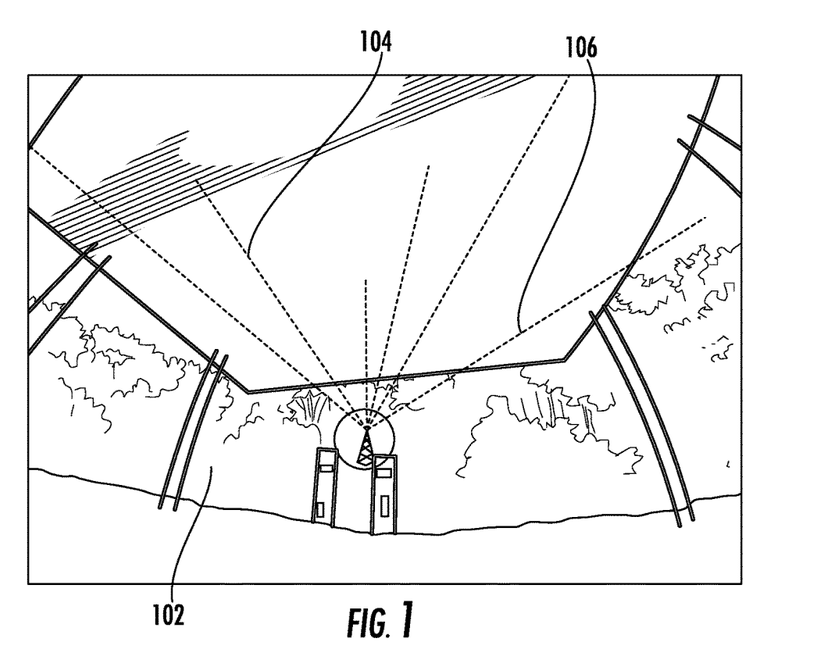
FIG. 1 depicts an example rendering according to an example embodiment of the present disclosure.

The rendering can be presented from a vantage point which is either internal or external to a spherical panorama. For example, FIG. 1 depicts rendering 102 as presented from a vantage point internal to the spherical panorama. In such fashion, the user can visualize the intersection of sightlines 104 and 106 with the spherical panorama from a vantage point internal to the spherical panorama.

Figure 2:
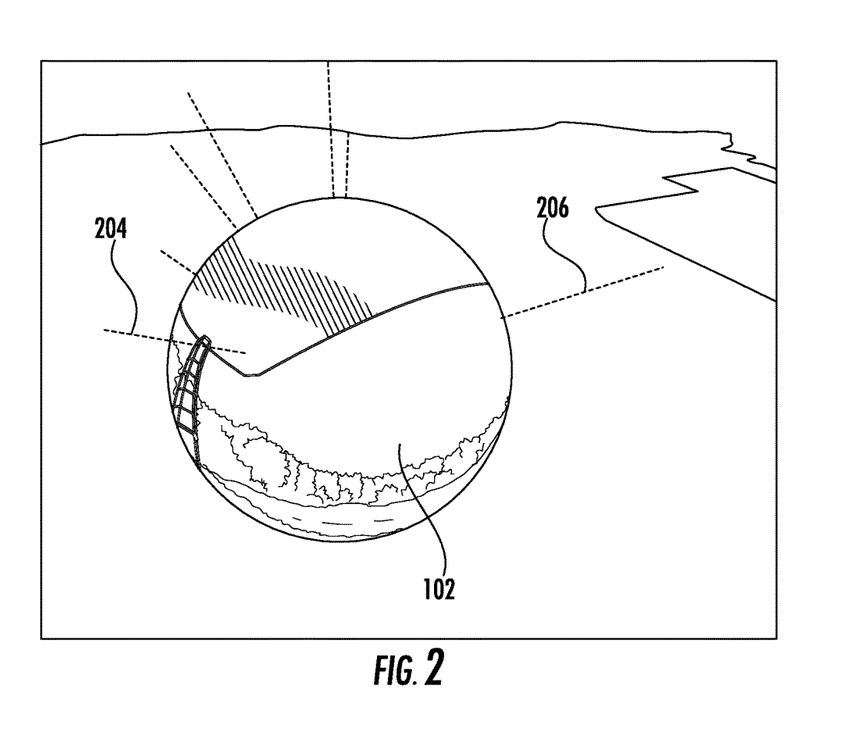
FIG. 2 depicts an example rendering according to an example embodiment of the present disclosure.

As another example, FIG. 2 depicts rendering 102 as presented from a vantage point external to a spherical panorama. In such fashion, the user can visualize the intersection of sightlines 204 and 206 with the spherical panorama from a vantage point external to the spherical panorama.

In other implementations, the rendering can be a rendering of data generated from a laser scanner or other environment capture device. For example, a laser scanner can generate data in the form of a plurality of points and each point can be associated with a geographic coordinate location. The plurality of points can be plotted in the three-dimensional space surrounding the antenna to provide a three-dimensional model of physical objects surrounding the antenna.

Furthermore, the rendering of data generated from a laser scanner can be centered about the approximate position of the receiver antenna. For example, the position of the laser scanner relative to the data can be located at the approximate position of the receiver antenna. A user can identify any sightline obstructions by inspecting the visualization of the intersection of the sightlines with the three-dimensional model generated based on the laser scanner data.

According to another aspect of the present disclosure, the rendering can be interactive and navigable such that the ability of a user to identify sightline obstructions is enhanced. In particular, a request can be received from a user, via a suitable user input device, to present the rendering from a vantage point selected by the user. In response, the rendering can be presented within the user interface from the vantage point selected by the user.

In one example, a rendering of a spherical panorama can be presented from a vantage point internal to a volume defined by the spherical panorama. As another example, the rendering can be presented from a vantage point external to the spherical panorama such as, for example, just external to the intersection of a sightline and the spherical panorama.

According to yet additional aspects of the present disclosure, a transparency factor associated with the rendering can be modified. For example, in one implementation, a transparency factor associated with a spherical panorama can be modified to 50%. The spherical panorama can then be presented within the user interface such that the spherical panorama is 50% transparent.

The transparency factor can be modified for only selected of a plurality of elements of the rendering. For example, the rendering can include a rendering of data generated from a laser scanner and one or more sightlines. As an example, the transparency factor associated with the rendering of data generated from a laser scanner can be modified to 50% while the transparency factor associated with the one or more sightlines can be left unmodified, such as a default transparency of 0%.

Thus, the systems of the present disclosure can allow a user to visually examine the rendering to determine the presence of an obstruction. The user can navigate and interact with the rendering via the user interface to obtain varying views of the obstruction. In this manner, an easier and more intuitive way to view sightline obstructions can be provided.

However, the presence of an obstruction can also be assessed in an automated fashion. For instance, the presence of an obstruction can be assessed using image analysis techniques such as object recognition, edge detection, gray-scale matching, gradient matching, sky mapping, feature-based methods, or other suitable computer-based image analysis techniques.

Knowledge regarding the presence or absence of sightline obstructions can improve positional calculation data in either a real-time application or a post-collection data weighting algorithm. For example, data received from a satellite determined to be obstructed can be disregarded when making real-time positional calculations. Alternatively, post-collection processing can perform positional calculations using a data weighting algorithm that takes into account the presence of a sightline obstruction as determined using the systems of the present disclosure.

In particular, the data weighting algorithm can combine data from many various sources including accelerometers, gyroscopes, logical constraints, weather conditions, satellite positioning data and other suitable forms of data. According to an aspect of the present disclosure, the data weighting algorithm can disregard data received from a satellite determined to be obstructed or otherwise reduce its impact on positional calculations such that the position of the receiver antenna can be more accurately calculated.

One example application of the present disclosure can be directed to assigning geographic position information to data collected by a data collection system, such as system provided in conjunction with a vehicle that is used to collect photographic imagery associated with the Street View™ imagery provided by Google Inc. More particularly, knowledge regarding the presence or absence of sightline obstructions can assist in determining the position of the data collection system in either a real-time application or a post-collection data weighting algorithm. More accurately determining the location of the data collection system can improve the accuracy of the geographic position information assigned to the data.

Example sightline obstruction visualization systems and methods according to example embodiments of the present disclosure will now be set forth. Due to the inherent flexibility of computer-based systems, one of ordinary skill in the art, in light of the disclosures contained herein, will understand that a great variety of possible configurations, combinations, and divisions of tasks and computing functionality between and among the components of a sightline obstruction visualization system are possible. For instance, the systems and methods according to aspects of the present disclosure can be implemented using a single computing device or across multiple computing devices in a parallel or distributed computing environment.

Figure 3:
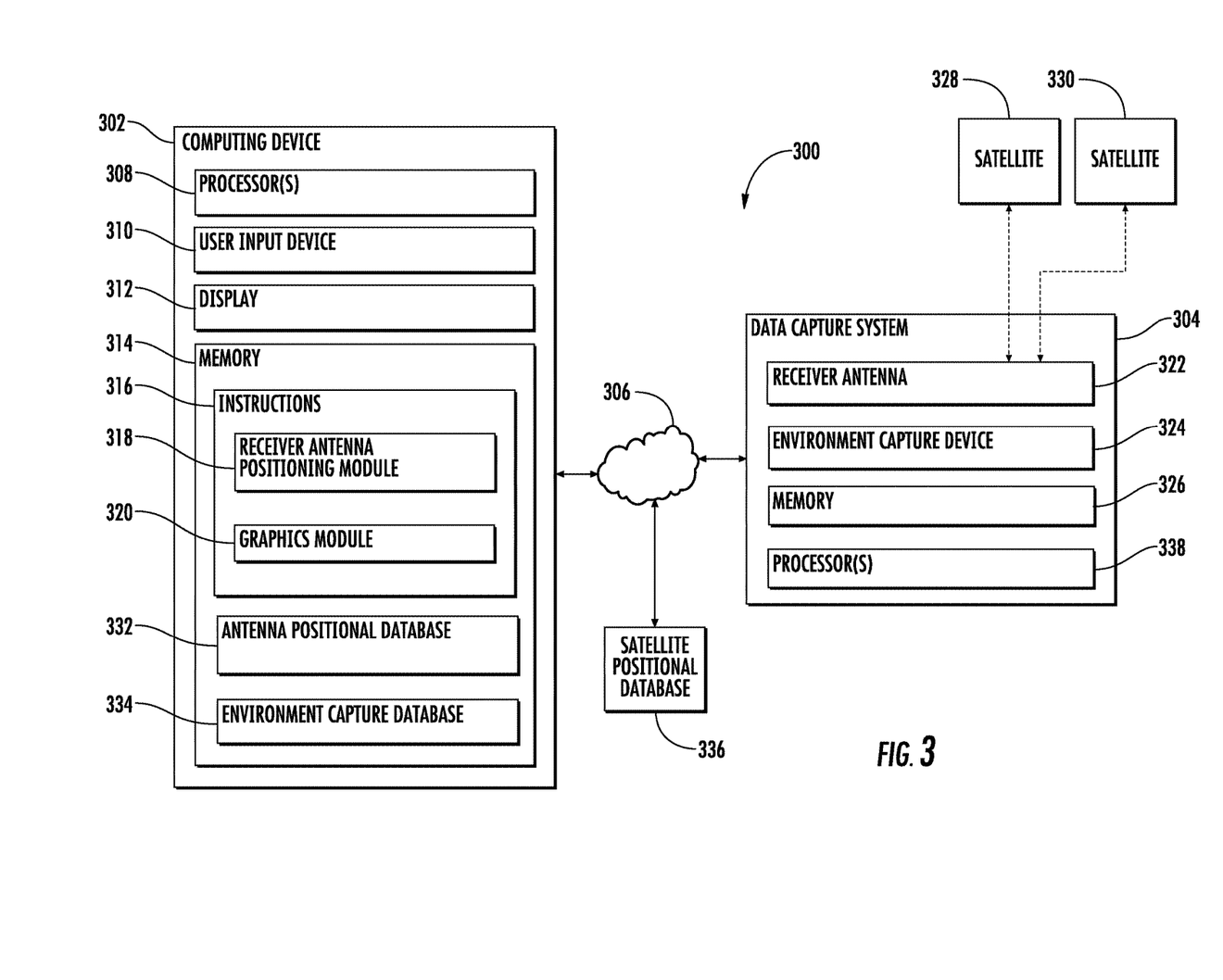
FIG. 3 depicts an example computer-based system for visualizing sightline obstructions according to an example embodiment of the present disclosure.

FIG. 3 depicts an example sightline obstruction visualization system 300 according to an example embodiment of the present disclosure. The system 300 can present a visualization of sightline obstructions between a receiver antenna and a satellite. System 300 can include a computing device 302 which is operable to receive data from a data capture system 304 over a network 306. Network 306 can be a LAN, WAN, or other suitable network and can include any number of wired or wireless links. Computing device 302 can be one computing device or a plurality of computing devices connected in a parallel or distributed computing system.

Computing device 302 can include a processor 308, user input device 310, display 312, and memory 314. Processor 308 can be one processor or can be a plurality of processors which are operably connected. The memory 314 can store instructions 316 which cause the processor to perform operations. For instance, the memory 314 can store instructions 316 to implement one or more modules. Such modules can include receiver antenna positioning module 318 for identifying the approximate position of a receiver antenna and graphics module 320 for generating an interactive rendering. Memory 314 can also include or be in communication with one or more databases such as antenna positional database 332 and environment capture database 334.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Data capture system 304 can include receiver antenna 322, environment capture device 324, memory 326, and processor 338. Receiver antenna 322 can be configured to receive satellite communication data from a plurality of satellites including satellite 328 and satellite 330. Memory 326 can include or be in communication with one or more databases. Processor 338 can be one processor or a plurality of processors operably connected. In an example implementation, the data capture system 304 can be a part of a street view car used to collect photographs of geographic imagery used to generate street level images, such as the Street View™ imagery provided by Google Inc.

Data capture system 304 can use satellite communication data received by receiver antenna 322 from a plurality of satellites, including satellites 328 and 330, to determine antenna positional data associated with receiver antenna 322. For example, processor 338 can determine antenna positional data associated with receiver antenna 322 through GPS location techniques. As another example, data capture system 304 can determine antenna positional data associated with receiver antenna 322 based upon a known location of data capture system 304. Such antenna positional data can be stored in memory 326.

Environment capture device 324 can capture data associated with the physical environment surrounding receiver antenna 322. Environment capture device 324 can take many various forms, including a laser scanner, camera, radar device, sonar device, infrared device, weather monitoring device, or other suitable data capture device. Thus, captured environmental data can be data generated from a laser scanner, a plurality of images captured by a camera and used to create panoramic images, weather condition data, or other suitable forms of environmental data. Captured environmental data can be stored in memory 326.

Data capture system 304 can transmit data to computing device 302 over network 306. For example, data capture system 304 can transmit antenna positional data to computing device 302 over network 306. The antenna positional data can be stored in antenna positional database 332. Although antenna positional database 332 is depicted in FIG. 3 as included within memory 314 of computing device 302, one of skill in the art, in light of the disclosures contained herein, will understand that data storage functionality can be distributed across a plurality of computing machines.

Data capture system 304 can also transmit data captured by environment capture device 324 to computing device 302 over network 306. The captured environmental data can be stored in environment capture database 334. Although environment capture database 334 is depicted in FIG. 3 as included within memory 314 of data capture system 304, one of skill in the art, in light of the disclosures contained herein, will understand that data storage functionality can be distributed across a plurality of computing machines.

Computing device 302 can use data accessed from antenna positional database 332 to identify an approximate position of receiver antenna 322. More particularly, processor 308 can implement receiver antenna positioning module 318 to perform an algorithm that identifies the approximate position of receiver antenna 322 based upon data from accelerometers, gyroscopes, lasers, logical constraints, environment capture database 334, antenna positional database 334, or other suitable data sources. As another example, the approximate position of receiver antenna 322 can be generally known and provided to computing device 302. Such antenna positional data can also be used to assign position data, such as geographic coordinate information, to data captured by environment capture device 324 and stored in environment capture database 334.

Computing device 302 can use data accessed from environment capture database 334 to generate a rendering. For example, the rendering can be a rendering of a three-dimensional model.

More particularly, processor 308 can implement graphics module 320 to access environmental data from environment capture database 334 and generate a rendering of the physical environment surrounding receiver antenna 322 based upon the accessed data. The accessed data can include data captured by environment capture device 324 and stored in environment capture database 334.

Graphics module 320 can be a video card, graphics engine, three-dimensional imaging module, or other suitable configuration for generating and processing three-dimensional graphics. Graphics module 320 can be further configured to manipulate and reprocess the rendering based upon user input, requests, and activity.

Computing device 302 can access satellite positional data associated with the position of a satellite from satellite positional database 336 over network 306. For example, satellite positional database 336 can be a database provided by the United States government which is accessible over the Internet. As an alternative example, satellite positional database 336 can be included as a sub-database of antenna positional database 332 and can store satellite positional information broadcasted by satellites 328 and 330 and received by receiver antenna 322.

According to aspects of the present disclosure, computing device 302 can determine a sightline between the approximate position of receiver antenna 322 and the position of a satellite based at least in part upon the satellite positional data. Processor 308 can then implement graphics module 320 to generate a rendering of the sightline in the form of a vector, line, or other suitable form. Computing device 302 can present the sightline within the user interface in association with the rendering of the physical environment. For example, processor 308 can implement graphics module 320 to present the sightline within the user interface in association with the rendering. Processor 308 can provide rendering data received from graphics module 320 to display 312 for presentation.

Processor 308 can receive user input via user input device 310. For example, the user input can request a view of the rendering from different vantage points. Processor 308 can then implement graphics module 320 to present the rendering and associated sightlines from various vantage points. In this manner, system 300 can provide an interactive system that facilitates viewing of sightlines obstructions from a variety of different perspectives.

Figure 4:
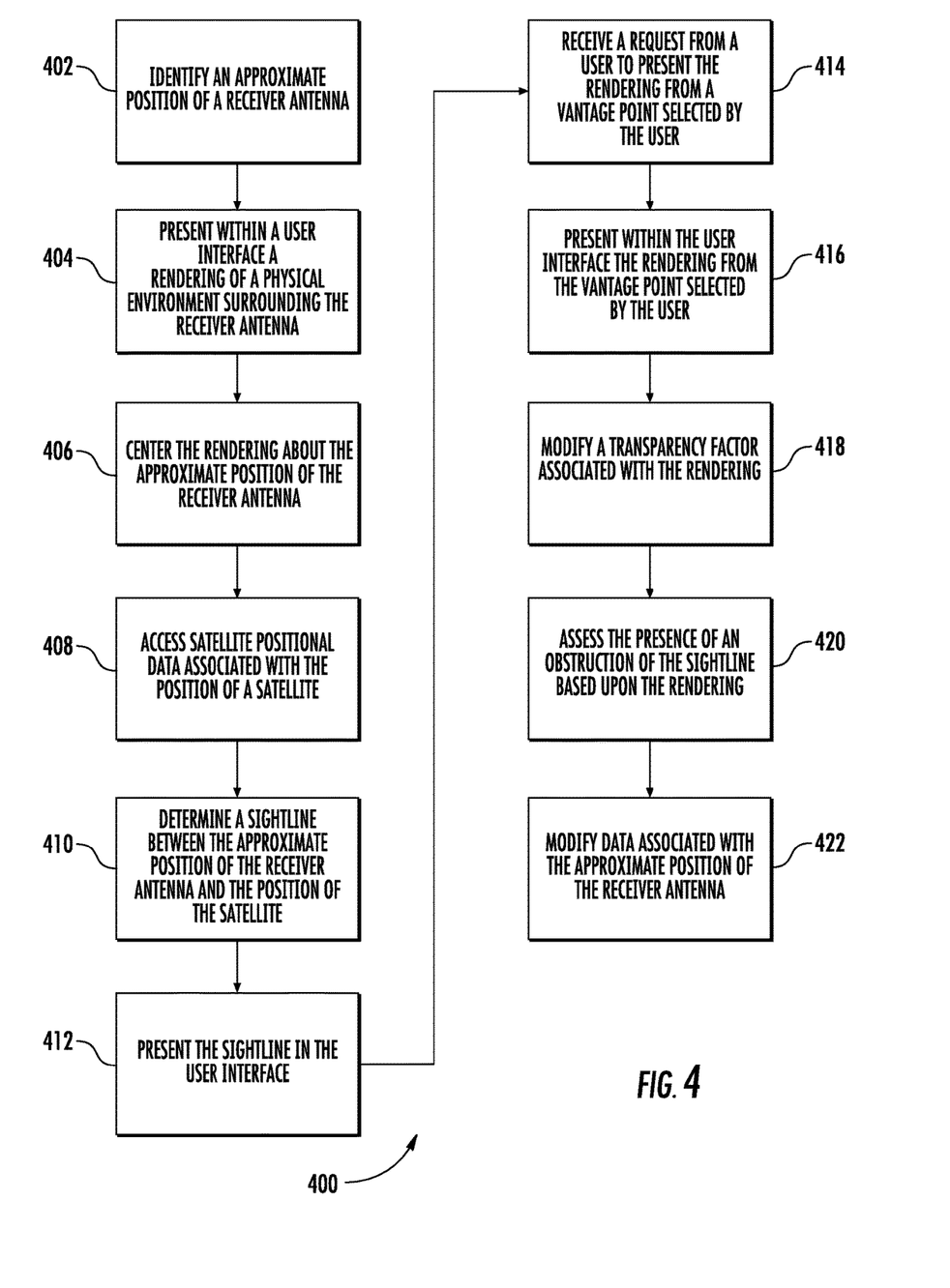
FIG. 4 depicts a flow chart of an example computer-implemented method according to an example embodiment of the present disclosure.

FIG. 4 depicts an example method (400) for providing a visualization of obstructions of a sightline between a receiver antenna and a satellite according to an example embodiment of the present disclosure. The example method (400) can be implemented using any suitable computing system, including sightline obstruction visualization system 300 of FIG. 3. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 4, at (402) an approximate position of a receiver antenna can be identified. For example, an approximate position of a receiver antenna can be identified using an algorithm which incorporates a plurality of data sources including accelerometers, gyroscopes, satellite communication data, dead reckoning, prior estimates of antenna positions, lasers, logical constraints, or other suitable data sources. A specific antenna positioning functionality, such as receiver antenna positioning module 320 of FIG. 3 can be employed to perform such an algorithm.

As another example, an approximate position of a receiver antenna can be identified using the satellite positions and transit times associated with satellite communication data received by a receiver antenna. As yet another example, an approximate position of a receiver antenna can be generally known and provided to a computing system implementing example method (400).

At (404) a rendering of a physical environment surrounding the receiver antenna can be presented within a user interface. The rendering can take many forms including, but not limited to, a rendering of a three-dimensional panorama or a rendering of data generated from a laser scanner. The rendering can be generated based upon data from various sources, including an environment capture device, such as a camera or laser scanner, or a database of captured environmental data. The rendering can be both interactive and navigable, as will be discussed further with regard to other steps of example method (400).

Figure 5:
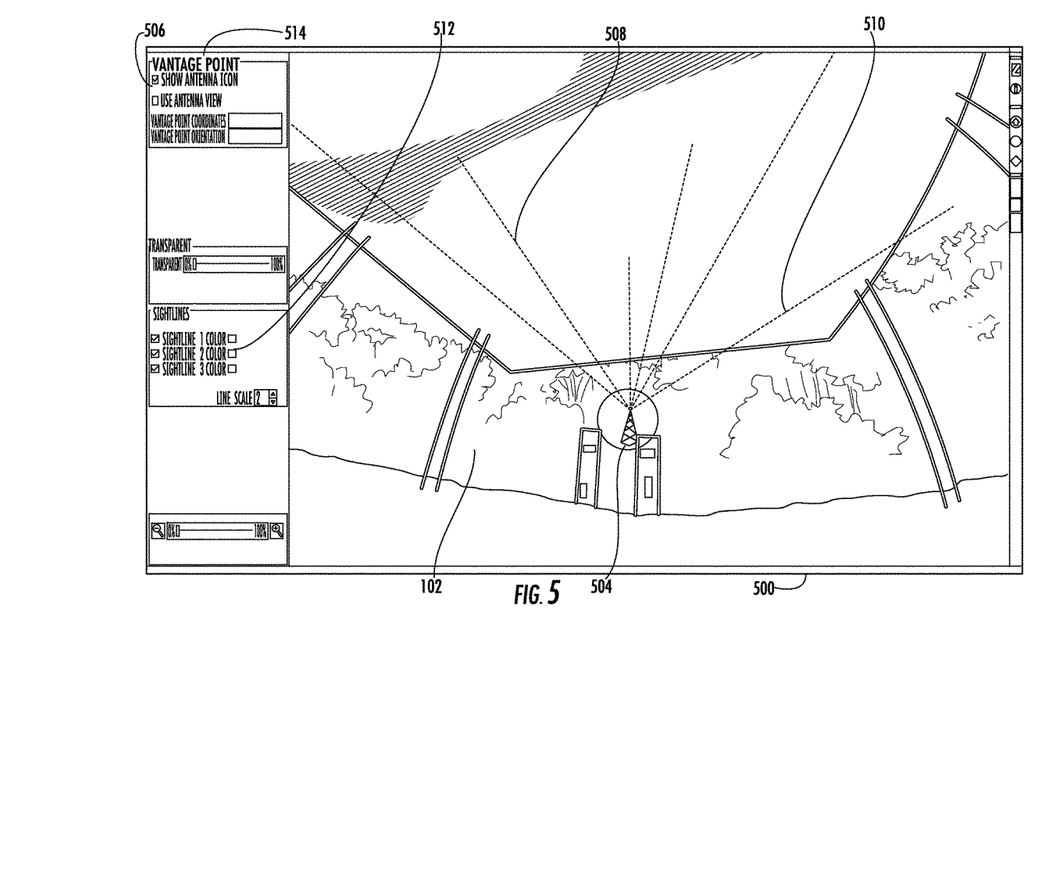
FIG. 5 depicts an example user interface according to an example embodiment of the present disclosure.

As an example, the rendering can be a rendering of a three-dimensional panorama, such as, for example, a spherical panorama, as is illustrated in FIG. 5. FIG. 5 depicts an example user interface 500 according to an example embodiment of the present disclosure. Rendering 102 is presented within user interface 500. Rendering 102 can depict a spherical panorama generated from one or more images captured by a data capture system, such as data capture system 304 of FIG. 3.

Figure 7:
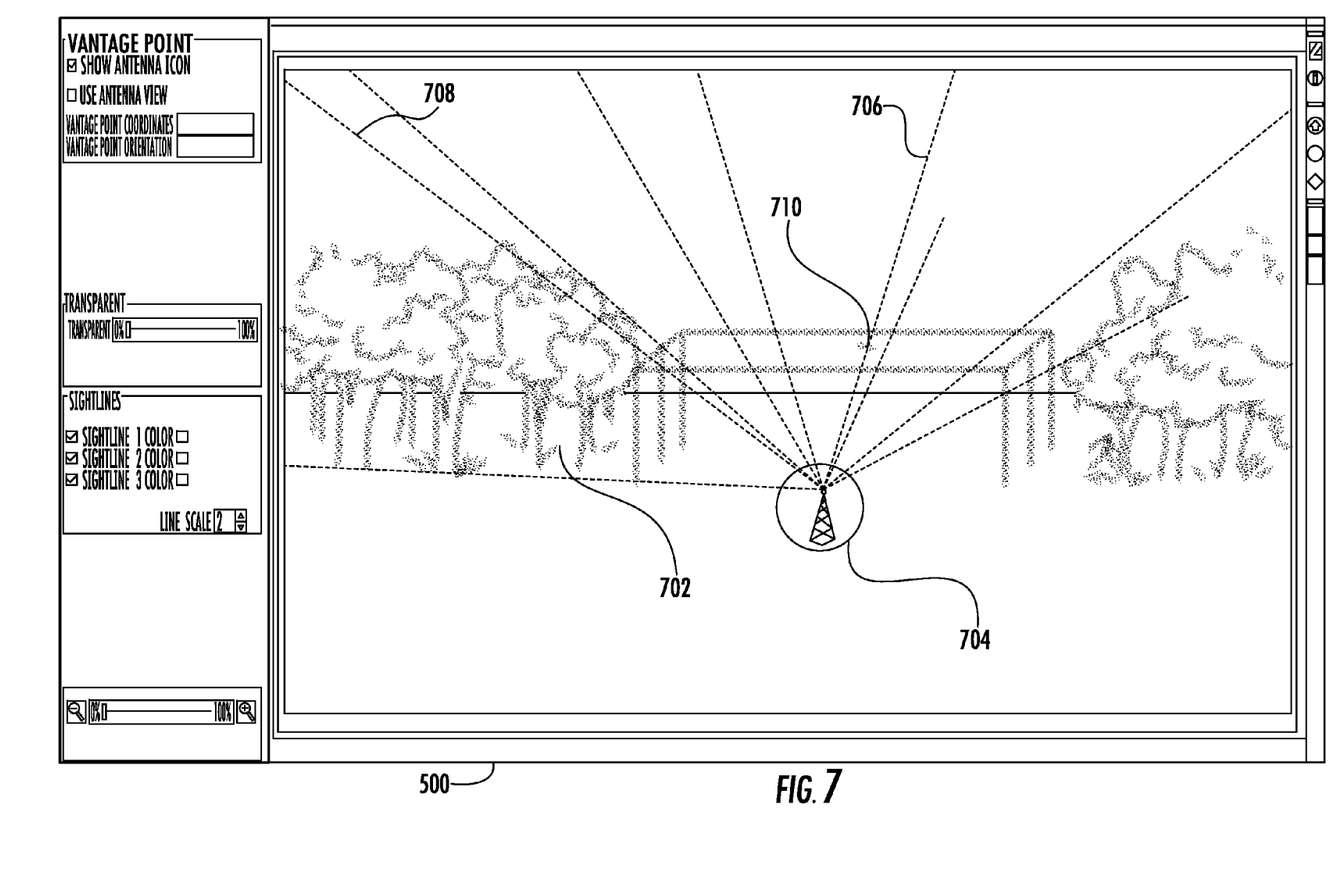
FIG. 7 depicts an example user interface according to an example embodiment of the present disclosure.

As another example, the rendering can be a rendering of data generated from a laser scanner, as illustrated in FIG. 7. FIG. 7 depicts an example user interface 500 according to an example embodiment of the present disclosure. More particularly, rendering 702 is presented within user interface 500. As depicted in FIG. 7, rendering 702 can be a rendering of data generated from a laser scanner.

Returning to FIG. 4, at (406) the rendering can be centered about the approximate position of the receiver antenna. For example, in the instance that the rendering of the physical environment surrounding the receiver antenna is a spherical panorama, then the spherical panorama can be centered about the approximate position of the receiver antenna. Alternatively, in the instance that the rendering of the physical environment surrounding the receiver antenna is a rendering of data generated from a laser scanner then the rendering can be positioned such that the position of the laser scanner relative to the data can be located at the approximate position of the receiver antenna.

At (408) satellite positional data associated with the position of a satellite can be accessed. Satellite positional data can be accessed in the form of satellite positional data stored in a database, satellite positional data received from a plurality of satellites by a receiver antenna, or other suitable source of satellite positional data.

At (410) a sightline can be determined between the approximate position of the receiver antenna and the position of the satellite based at least in part upon the satellite positional data. The sightline can be a vector, line, or other suitable sightline from the approximate position of the receiver antenna to the position of the satellite.

At (412) a rendering of the sightline can be presented within the user interface in association with the rendering. For example, referring to FIG. 5, sightlines 508 and 510 are presented within user interface 500. Sightlines 508 and 510 can be presented as directional vectors, lines of adjustable color, weight, and pattern, or other suitable forms of sightline presentment. A user can toggle sightlines on or off or adjust color, weight, or pattern at sightline control panel 512 of user interface 500. One of skill in the art, in light of the disclosures contained herein, will understand that many other attributes of sightlines 508 and 510 can be controlled by a user through sightline control panel 512.

Also shown in FIG. 5 is receiver antenna icon 504, which indicates the approximate position of the receiver antenna. The display of receiver antenna icon 504 can be toggled on or off using receiver antenna icon toggle 506. One of skill in the art, in light of the disclosures contained herein, will understand that many other attributes of the receiver antenna icon 504 can be controlled by a user through user interface 500.

Referring now to FIG. 7, sightlines 706 and 708 can be presented within user interface 500. Intersection 710 of sightline 706 and an object of the physical environment depicted by rendering 702 can be observed. Also shown in FIG. 7 is receiver antenna icon 704.

Returning again to FIG. 4, at (414) a user request to present the rendering from a vantage point selected by the user can be received. Such a user request can be inputted by a user to the computing device 302 of FIG. 3 using user input device 316. User input device 316 can be a mouse, touchpad, keyboard, or other suitable user input device.

Referring now to FIG. 5, a user request to present the rendering from a vantage point selected by the user can be received via vantage point control panel 514. Vantage point control panel 514 allows a user to select and input a selected vantage point. The vantage point can include a coordinate location and an orientation or perspective. As an example, vantage point control panel 514 can receive a user request in the form of a three-dimensional Cartesian coordinate location paired with a three-dimensional Cartesian coordinate unit vector orientation or perspective. As an alternative, vantage point control panel 514 can receive a user request in the form of a three-dimensional spherical coordinate location paired with an orientation or perspective comprising a polar angle together with an azimuthal angle.

A user request to present the rendering 102 from a vantage point selected by the user can also be received through user interaction with rendering 102. For example, if a user clicks and holds on the rendering 102 using a mouse and moves the mouse to the right, then this can be interpreted as a user request to rotate the rendering about the z-axis of the current vantage point in a counter-clockwise fashion.

One of ordinary skill in the art, in light of the disclosures contained herein, will understand that many various interactive controls are possible with an interactive, navigable rendering and that each of these is within the scope of the present disclosure. For example, a user can zoom in or out the rendering 102 using a zoom bar, mouse wheel, or other suitable user request. In another implementation, a user can navigate through rendering using keyboard inputs or by interacting with controls presented within the user interface.

Returning to FIG. 4, at (416) the rendering can be presented within the user interface from the vantage point selected by the user. For instance, in FIG. 5, the user has requested to view rendering 102 from a vantage point inside the volume defined by the spherical panorama. In response, rendering 102 is presented within user interface 500 from the vantage point requested by the user.

Figure 6:
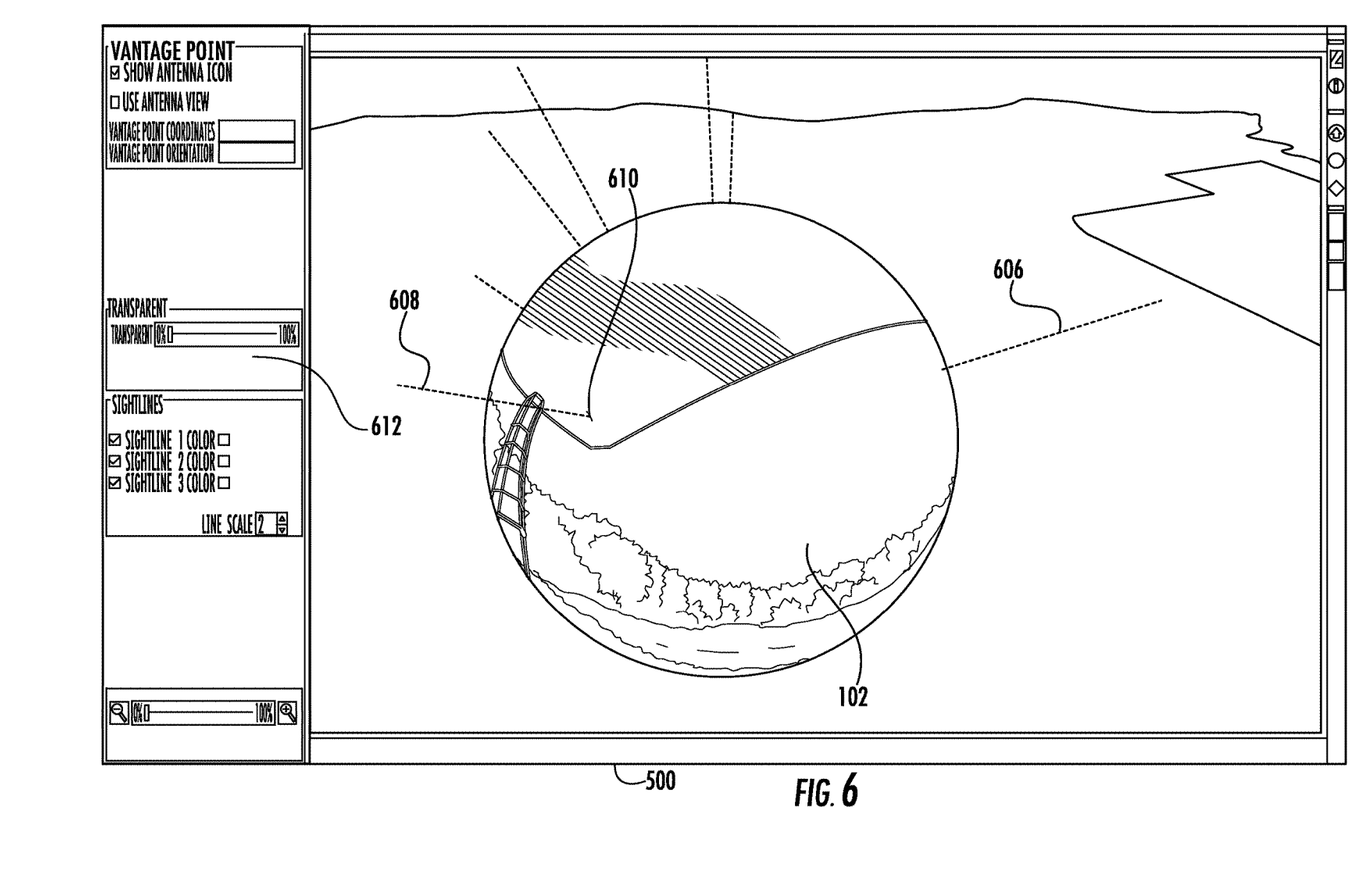
FIG. 6 depicts an example user interface according to an example embodiment of the present disclosure.

As another example, if the user subsequently requested to view rendering 102 from a vantage point external to a spherical panorama via vantage point control panel 514 of FIG. 5, then the rendering can be presented as shown in FIG. 6. More particularly, FIG. 6 shows rendering 102, depicted here as including a spherical panorama, presented within user interface 500 from a vantage point external to the spherical panorama. Sightlines 606 and 608 can be presented within user interface 500. The intersection 610 of sightline 608 with an object of the physical environment depicted by rendering 102 can be observed.

Returning again to FIG. 4, at (418) a transparency factor associated with the rendering can be modified. For example, referring to FIG. 6, a user can use transparency control panel 612 to request that a transparency factor associated with rendering 102 be modified to 50%. The transparency factor can be modified and rendering 102 can be presented within user interface 500 such that rendering 102 is 50% transparent. Presenting rendering 102 in such fashion can allow a user to see through any obstructions captured in rendering 102. If three dimensional rendering 102 is a spherical panorama, as is depicted in FIG. 6, then modifying the transparency factor can allow the user to see the interior of the spherical panorama from a vantage point exterior to the spherical panorama.

Returning to FIG. 4, at (420) the presence of an obstruction of the sightline can be assessed based upon the rendering. For example, a user can manually determine the presence of an obstruction. The user can navigate through and interact with the rendering via the user interface. The user can observe whether a sightline is obstructed by any elements of the physical environment depicted in the rendering and can input the manual determination into the system.

Alternatively, the presence of an obstruction of a sightline can be assessed in an automated fashion at (420). For instance, the presence of an obstruction can be assessed using image analysis techniques such as object recognition, edge detection, grayscale matching, gradient matching, sky mapping, feature-based methods, or other suitable computer-based image analysis techniques.

At (422) data associated with the approximate position of the receiver antenna can be modified based upon the assessment of the presence of an obstruction. For example, data received from a satellite determined to be obstructed can be disregarded when refreshing or otherwise recalculating the approximate position of the receiver antenna. Alternatively, post-collection processing can calculate the approximate position of the receiver antenna using a data weighting algorithm which takes into account the presence of an obstruction of a sightline. The data weighting algorithm can disregard data received from a satellite determined to be obstructed or otherwise reduce its impact on positional calculations. The data weighting algorithm can combine data from many various sources including accelerometers, gyroscopes, logical restraints, satellite positioning data and other suitable forms of data to determine a globally optimized position of the receiver antenna. In such fashion, the position of a receiver antenna can be more accurately calculated.

The approximate position of the receiver antenna as calculated by the data weighting algorithm can be presented in the user interface. In addition, in one implementation, a plurality of different antenna positions can be presented based upon different selected combinations of obstructed and/or non-obstructed satellites to facilitate comparison by the user. Thus, the systems of the present disclosure can allow a user to select various combinations of satellites and, in response, provide a plurality of different potential positions based on data respectively associated with such various combinations.

Figure 8:
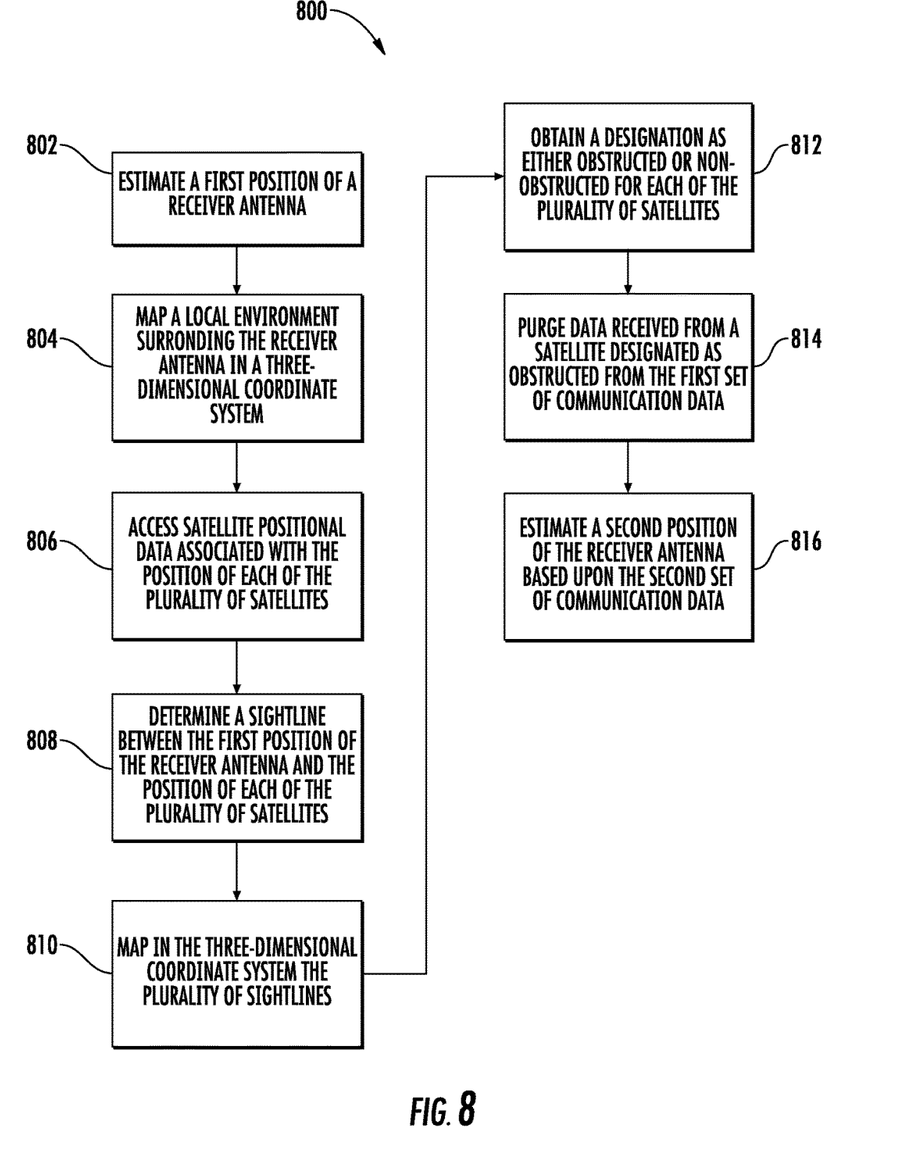
FIG. 8 depicts a flow chart of an example computer-implemented method according to an example embodiment of the present disclosure.

FIG. 8 depicts a flow chart of an example computer-implemented method (800) according to an example embodiment of the present disclosure. The example method (800) can be implemented using any suitable computing system, including sightline obstruction visualization system 300 of FIG. 3. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (802) a first position of a receiver antenna can be estimated. For example, a first position of a receiver antenna can be estimated based upon a first set of communication data received by a receiver antenna from a plurality of satellites. As an example, GPS location techniques can be used to estimate the first position of the receiver antenna based upon the first set satellite communication data.

At (804) a local environment surrounding the receiver antenna can be mapped in a three-dimensional coordinate system. For example, data generated from a laser scanner can be mapped in a three-dimensional spherical coordinate system. As another example, a plurality of images of a local environment can be captured and the images can be mapped to a sphere, cone, oval, hemisphere, or other suitable three-dimensional surface to form an approximately and/or partially spherical panorama.

At (806) satellite positional data associated with the position of each of the plurality of satellites can be accessed. For example, satellite positional data associated with the position of each of the satellites can be a sub-set of the first set of communication data received by the receiver antenna from the plurality of satellites. As another example, a satellite positional database storing satellite positional data can be accessed over a network.

At (808) a sightline between the first position of the receiver antenna and the position of each of the plurality of satellites can be determined. For example, a sightline can be determined as a vector or line from the first position of the receiver antenna to the position of one of the plurality of satellites. A plurality of sightlines can be determined such that each of the plurality of sightlines corresponds to one of the plurality of satellites.

At (810) the plurality of sightlines can be mapped in the three-dimensional coordinate system. For example, the plurality of sightlines can be mapped in the three-dimensional coordinate system such that the plurality of sightlines superimpose the mapping of the local environment.

At (812) a designation can be obtained for each of the plurality of satellites. Each of the plurality of satellites can be designated as either obstructed or non-obstructed based upon the presence of an obstruction of each satellite's corresponding sightline. In one implementation, if a satellite's corresponding sightline and the mapping of the local environment jointly occupy one or more coordinate locations within the three-dimensional coordinate system then the satellite can be designated as obstructed. In another implementation, the intersection of each sightline and the mapping of the local environment can be visually examined and a user can input a designation for each corresponding satellite. As yet another example, one or more image analysis techniques can be performed to determine the presence of an obstruction and obtain the designation for each of the plurality of satellites.

At (814) a second set of communication data can be generated by purging, from the first set of communication data, any communication data received from a satellite designated as obstructed. At (816) a second position of the receiver antenna can be estimated based upon the second set of communication data. For example, GPS location techniques can be used to estimate the second position of the receiver antenna based upon the second set of satellite communication data. In such fashion, the position of a receiver antenna can be more accurately calculated.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing a visualization of sightline obstructions, the method comprising:
providing, by one or more computing devices, a rendering of a physical environment surrounding a receiver antenna for display within a user interface, wherein the user interface is provided on a display;
determining, by the one or more computing devices, one or more sightlines between the receiver antenna and one or more satellites;
providing, by the one or more computing devices, the one or more sightlines for display within the user interface in association with the rendering, wherein the one or more sightlines superimpose the rendering of the physical environment; and
determining, by the one or more computing devices, whether the one or more sightlines are obstructed by analyzing the rendering and the one or more sightlines.

2. The computer-implemented method of claim 1, further comprising:
identifying, by the one or more computing devices, a satellite as obstructed when a sightline associated with that satellite is determined to be obstructed by analyzing the rendering and the one or more sightlines; and
modifying, by the one or more computing devices, data associated with an approximate position of the receiver antenna based upon the identification.

3. The computer-implemented method of claim 1, further comprising:
identifying, by the one or more computing devices, an approximate position of the receiver antenna; and
wherein the approximate position of the receiver antenna is used at least in part to provide a rendering of the physical environment surrounding the receiver antenna for display within a user interface.

4. The computer-implemented method of claim 3, further comprising:
accessing, by the one or more computing devices, satellite positional data describing a position of each satellite; and wherein the satellite positional data describing a position of each satellite is used at least in part to determine one or more sightlines between the receiver antenna and the one or more satellites.

5. The computer-implemented method of claim 1, wherein the rendering comprises a rendering of a three-dimensional panorama.

6. The computer-implemented method of claim 5, wherein the three-dimensional panorama comprises an approximately spherical panorama, and wherein the method further comprises centering, by the one or more computing devices, the rendering of the approximately spherical panorama about an approximate position of the receiver antenna.

7. The computer-implemented method of claim 1, wherein the rendering comprises a rendering of data generated from a laser scanner.

8. The computer-implemented method of claim 7, wherein the data generated from the laser scanner comprises a plurality of points, wherein each point is associated with a geographic coordinate location.

9. The computer-implemented method of claim 7, further comprising:
centering, by the one or more computing devices, the rendering of the data generated from the laser scanner about an approximate position of the receiver antenna.

10. The computer-implemented method of claim 1, further comprising:
receiving, by the one or more computing devices, a request from a user to present the rendering from a vantage point selected by the user; and
presenting, by the one or more computing devices, the rendering within the user interface from the vantage point selected by the user.

11. The computer-implemented method of claim 10, wherein the rendering comprises a rendering of an approximately spherical panorama, and wherein the vantage point selected by the user comprises a coordinate location included in the volume enclosed by the approximately spherical panorama.

12. The computer-implemented method of claim 10, wherein the rendering comprises a rendering of an approximately spherical panorama, and wherein the vantage point selected by the user comprises a coordinate location external to the approximately spherical panorama.

13. The computer-implemented method of claim 1, further comprising:
modifying, by the one or more computing devices, a transparency factor associated with the rendering.

14. The computer-implemented method of claim 13, wherein the rendering comprises a plurality of elements and the transparency factor is modified for selected of the plurality of elements.

15. A non-transitory computer-readable medium storing instructions that, when executed by one or more computing devices, cause the one or more computing devices to perform operations, the operations comprising:

providing, by one or more computing devices, an interactive rendering of a physical environment surrounding a receiver antenna for display within a user interface, wherein the user interface is provided on a display of the one or more computing devices;

determining, by the one or more computing devices, one or more sightlines between the receiver antenna and one or more satellites;

providing, by the one or more computing devices, the one or more sightlines for display within the user interface in association with the rendering, wherein the one or more sightlines superimpose the rendering of the physical environment; and determining, by the one or more computing devices, whether the one or more sightlines are obstructed by analyzing the rendering and the one or more sightlines.

16. The non-transitory computer-readable medium of claim 15, wherein the operations further comprise:
identifying, by the one or more computing devices, a satellite as obstructed when a sightline associated with that satellite is determined to be obstructed by analyzing the rendering and the one or more sightlines; and
modifying, by the one or more computing devices, data associated with an approximate position of the receiver antenna based upon the identification.

17. The non-transitory computer-readable medium of claim 15, wherein the operations further comprise:
identifying, by the one or more computing devices, an approximate position of the receiver antenna; and
wherein the approximate position of the receiver antenna is used at least in part to provide a rendering of the physical environment surrounding the receiver antenna for display within a user interface.

18. The non-transitory computer-readable medium of claim 15, wherein the operations further comprise:
accessing, by the one or more computing devices, satellite positional data describing a position of each satellite; and
wherein the satellite positional data describing a position of each satellite is used at least in part to determine one or more sightlines between the receiver antenna and the one or more satellites.

19. The non-transitory computer-readable medium of claim 15, wherein the rendering comprises one of a rendering of an approximately spherical panorama or a rendering of data generated from a laser scanner.

20. The non-transitory computer-readable medium of claim 15, wherein the operations further comprise:
receiving, by the one or more computing devices, a request from a user to present the rendering from a vantage point selected by the user; and
presenting, by the one or more computing devices, the rendering within the user interface from the vantage point selected by the user.

* * * * *